(12) United States Patent
Banerjee et al.

(10) Patent No.: US 10,868,760 B2
(45) Date of Patent: Dec. 15, 2020

(54) SYSTEM AND METHOD FOR MANAGING PUBLIC IP ADDRESSES FOR VIRTUAL DATA CENTERS (71) Applicant: VMWARE, INC., Palo Alto, CA (US)

(72) Inventors: Sujeet Banerjee, Pune (IN); Sureshbabu Koyadan Chathoth, Bangalore (IN); Venu Gopala Rao Kotha, Bangalore (IN); Sachin M. Bendigeri, Bangalore (IN); Kiran Kumar Cherivirala, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 189 days.

(21) Appl. No.: 15/498,470

(22) Filed: Apr. 27, 2017

(65) Prior Publication Data

US 2018/0176130 A1 Jun. 21, 2018

(30) Foreign Application Priority Data

Dec. 19, 2016 (IN) .............................. 201641043345

(51) Int. Cl.
*H04L 12/741* (2013.01)
*H04L 12/713* (2013.01)
*H04L 12/46* (2006.01)
*H04L 29/12* (2006.01)

(52) U.S. Cl.
CPC .......... *H04L 45/74* (2013.01); *H04L 12/4633* (2013.01); *H04L 12/4641* (2013.01); *H04L 45/586* (2013.01); *H04L 61/2514* (2013.01); *H04L 61/2521* (2013.01); *H04L 61/2557* (2013.01); *H04L 61/2015* (2013.01)

(58) Field of Classification Search
None
See application file for complete search history.

(56) References Cited

U.S. PATENT DOCUMENTS

| | | | | |
|---|---|---|---|---|
| 2015/0106489 | A1* | 4/2015 | Duggirala | H04L 61/2503 709/222 |
| 2015/0195178 | A1* | 7/2015 | Bhattacharya | H04L 45/745 718/1 |
| 2016/0105471 | A1* | 4/2016 | Nunes | H04L 12/4633 709/228 |

* cited by examiner

*Primary Examiner* — Christopher M Crutchfield
*Assistant Examiner* — Alan L Lindenbaum
(74) *Attorney, Agent, or Firm* — Loza & Loza, LLP (57) ABSTRACT System and method for managing public internet protocol (IP) addresses for a group of virtual data centers utilize a virtual overlay network to route communications between the virtual data centers and a public network through a virtual edge router of one of the virtual data centers using a public IP address assigned to that virtual edge router.

14 Claims, 6 Drawing Sheets

SYSTEM AND METHOD FOR MANAGING PUBLIC IP ADDRESSES FOR VIRTUAL DATA CENTERS

RELATED APPLICATION

Benefit is claimed under 35 U.S.C. 119(a)-(d) to Foreign Application Serial No. 201641043345 filed in India entitled "SYSTEM AND METHOD FOR MANAGING PUBLIC IP ADDRESSES FOR VIRTUAL DATA CENTERS", filed on Dec. 19, 2016, by VMware, Inc., which is herein incorporated in its entirety by reference for all purposes.

BACKGROUND

Private networks, such as data centers, can use any type of addresses for communications within their individual networks. However, for external communications through the Internet, public Internet Protocol (IP) addresses are required to route communications through the Internet using a router or a gateway. Thus, for each private network connected to the Internet, at least one public IP address is needed.

With the advent of network virtualization, such as virtual extensible local area network (VXLAN) backed overlay networks, virtual private networks can readily be created in a computing environment, such as a cloud computing environment. Network virtualization allows a physical subnet to be virtually partitioned into more than one disjoint logical subnets. In addition, network virtualization allows a logical network to be created that span access physical network boundaries.

Using network virtualization, a business enterprise can create multiple virtual networks in a computing environment. As the number of virtual networks increases, there is a need to efficiently manage public IP addresses needed by the virtual networks since public IP addresses are a limited resource in a given computing environment.

SUMMARY

System and method for managing public internet protocol (IP) addresses for a group of virtual data centers utilize a virtual overlay network to route communications between the virtual data centers and a public network through a virtual edge router of one of the virtual data centers using a public IP address assigned to that virtual edge router.

A method for managing public internet protocol (IP) addresses for a group of virtual data centers in a computer system in accordance with an embodiment of the invention comprises transmitting a communication destined for a public network from a virtual computing instance running in a first virtual data center in the group of virtual data centers to a first virtual edge router of the first virtual data center, the communication including a source address corresponding to a private IP address assigned to the virtual computing instance, translating the source address of the communication at the first virtual edge router from the private IP address to a virtual overlay network IP address assigned to the first virtual edge router of the first virtual data center, transmitting the communication from the first virtual edge router of the first virtual data center to a second virtual edge router of a second virtual data center in the group of virtual data centers through a virtual overlay network, translating the source address of the communication at the second virtual edge router from the virtual overlay network IP address to a public IP address assigned to the second virtual edge router of the second virtual data center, and transmitting the communication from the second virtual edge router of the second virtual data center to the public network using the public IP address as the source address of the communication. In some embodiments, the steps of this method are performed when program instructions contained in a computer-readable storage medium is executed by one or more processors.

A system in accordance with an embodiment of the invention comprises a plurality of host computers interconnected via physical network components, a first virtual data center configured on the plurality of host computers, the first virtual data center including a first plurality of virtual computing instances and a first virtual edge router, and a second virtual data center configured on the plurality of host computers, the second virtual data center including a second plurality of virtual computing instances and a second virtual edge router. The first virtual edge router of the first virtual data center and the second virtual edge router of the second virtual data center are connected through a virtual overlay network, where only the second virtual edge router is assigned a public IP address for the first and second virtual data centers to communicate with a public network. The first and second virtual edge routers are configured to route all communications to and from the public network through the second virtual edge router using the public IP address.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
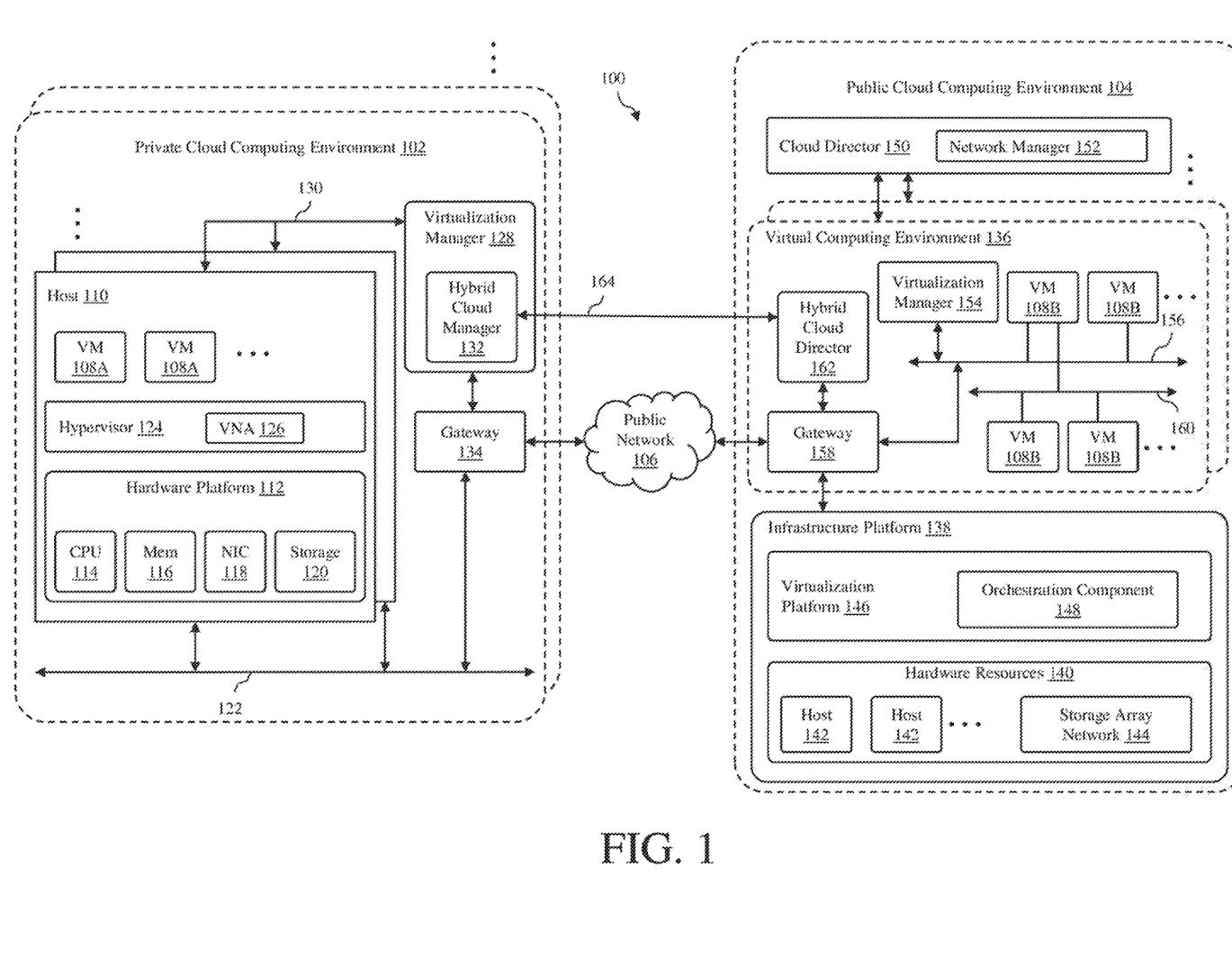
FIG. 1 is a block diagram of a hybrid cloud system in accordance with an embodiment of the invention.

Turning now to FIG. 1, a block diagram of a hybrid cloud system 100 in accordance with an embodiment of the invention is shown. The hybrid cloud system includes at least one private cloud computing environment 102 and at least one public cloud computing environment 104 that are connected via a public network 106. The hybrid cloud system is configured to provide a common platform for managing and executing workloads seamlessly between the private and public cloud computing environments. In one embodiment, the private cloud computing environment may be controlled and administrated by a particular enterprise or business organization, while the public cloud computing environment may be operated by a cloud computing service provider and exposed as a service available to account holders or tenants, such as the particular enterprise in addition to other enterprises. In some embodiments, the private cloud computing environment may comprise one or more on-premise data centers.

The private and public cloud computing environments 102 and 104 of the hybrid cloud system 100 include computing and/or storage infrastructures to support a number of virtual computing instances 108A and 108B. As used herein, the term "virtual computing instance" refers to any software entity that can run on a computer system, such as a software application, a software process, a virtual machine (VM), e.g., a VM supported by virtualization products of VMware, Inc., and a software "container", e.g., a Docker container. However, in this disclosure, the virtual computing instances will be described as being VMs, although embodiments of the invention described herein are not limited to VMs.

The VMs 108A and 108B running in the private and public cloud computing environments 102 and 104, respectively, may be used to form virtual data centers using resources from both the private and public cloud computing environments. The VMs within a virtual data center can use private IP addresses to communicate each other since these communications. However, in conventional cloud systems, VMs in different virtual data centers require at least one public IP address to communicate with external devices, i.e., devices external to the virtual data centers, via the public network. Thus, each virtual data center would typically need at least one public IP address for such communications. Since public IP addresses are a limited resource, assigning at least one public IP address for each of the virtual data center supported by a public cloud computing environment, which may be hundreds or thousands of virtual data centers, is not an efficient management of public IP addresses. In addition, since tenants of a public cloud computing environment may be charged for additional public IP addresses, there is a financial incentive to reduce the number of public IP addresses needed for virtual data centers of the public cloud tenants. As described in detail below, the hybrid cloud system 100 employs an efficient routing technique using a virtual overlay network to manage public IP addresses used by the virtual data centers supported by the public cloud computing environment, which can conserve the number of public IP address used by the virtual data centers.

As shown in FIG. 1, the private cloud computing environment 102 of the hybrid cloud system 100 includes one or more host computer systems ("hosts") 110. The hosts may be constructed on a server grade hardware platform 112, such as an x86 architecture platform. As shown, the hardware platform of each host may include conventional components of a computing device, such as one or more processors (e.g., CPUs) 114, system memory 116, a network interface 118, storage system 120, and other I/O devices such as, for example, a mouse and a keyboard (not shown). The processor 114 is configured to execute instructions, for example, executable instructions that perform one or more operations described herein and may be stored in the memory 116 and the storage system 120. The memory 116 is volatile memory used for retrieving programs and processing data. The memory 116 may include, for example, one or more random access memory (RAM) modules. The network interface 118 enables the host 110 to communicate with another device via a communication medium, such as a physical network 122 within the private cloud computing environment 102. The physical network 122 may include physical hubs, physical switches and/or physical routers that interconnect the hosts 110 and other components in the private cloud computing environment 102. The network interface 118 may be one or more network adapters, such as a Network Interface Card (NIC). The storage system 120 represents local storage devices (e.g., one or more hard disks, flash memory modules, solid state disks and optical disks) and/or a storage interface that enables the host 110 to communicate with one or more network data storage systems. Example of a storage interface is a host bus adapter (HBA) that couples the host 110 to one or more storage arrays, such as a storage area network (SAN) or a network-attached storage (NAS), as well as other network data storage systems. The storage system 120 is used to store information, such as executable instructions, cryptographic keys, virtual disks, configurations and other data, which can be retrieved by the host 110.

Each host 110 may be configured to provide a virtualization layer that abstracts processor, memory, storage and networking resources of the hardware platform 112 into the virtual computing instances, e.g., the VMs 108A, that run concurrently on the same host. The VMs run on top of a software interface layer, which is referred to herein as a hypervisor 124, that enables sharing of the hardware resources of the host by the VMs. One example of the hypervisor 124 that may be used in an embodiment described herein is a VMware ESXi™ hypervisor provided as part of the VMware vSphere® solution made commercially available from VMware, Inc. The hypervisor 124 may run on top of the operating system of the host or directly on hardware components of the host. For other types of virtual computing instances, the host 110 may include other virtualization software platforms to support those processing entities, such as Docker virtualization platform to support software containers. In the illustrated embodiment, the host 110 also includes a virtual network agent 126. The virtual network agent 126 operates with the hypervisor 124 to provide virtual networking capabilities, such as bridging, L3 routing, L2 Switching and firewall capabilities, so that software defined networks or virtual networks can be created. The virtual network agent 126 may be part of a VMware NSX® virtual network product installed in the host 110 ("VMware NSX" is a trademark of VMware, Inc.). In a particular implementation, the virtual network agent 126 may be a virtual extensible local area network (VXLAN) endpoint device (VTEP) that operates to execute operations with respect to encapsulation and decapsulation of packets to support a VXLAN backed overlay network.

The private cloud computing environment 102 includes a virtualization manager 128 that communicates with the hosts 110 via a management network 130. In an embodiment, the virtualization manager 128 is a computer program that resides and executes in a computer system, such as one of the hosts 110, or in a virtual computing instance, such as one of the VMs 108A running on the hosts. One example of the virtualization manager 128 is the VMware vCenter Server® product made available from VMware, Inc. The virtualization manager 128 is configured to carry out administrative tasks for the private cloud computing environment 102, including managing the hosts 110, managing the VMs 108A running within each host, provisioning new VMs, migrating the VMs from one host to another host, and load balancing between the hosts.

In one embodiment, the virtualization manager 128 includes a hybrid cloud manager 132 configured to manage and integrate computing resources provided by the private cloud computing environment 102 with computing resources provided by the public cloud computing environment 104 to form a unified "hybrid" computing platform, which is sometimes referred to herein as a hybrid cloud computing environment. The hybrid cloud manager 132 is configured to deploy virtual computing instances, e.g., the VMs 108A, in the private cloud computing environment 102, transfer the VMs from the private cloud computing environment to the public cloud computing environment 104, and perform other "cross-cloud" administrative tasks. In one implementation, the hybrid cloud manager 132 is a module or plug-in to the virtualization manager 128, although other implementations may be used, such as a separate computer program executing in any computer system or running in a VM on one of the hosts 110. One example of the hybrid cloud manager 132 is the VMware vCloud® Connector™ product made available from VMware, Inc.

In one embodiment, the hybrid cloud manager 132 is configured to control network traffic into the network 106 via a gateway device 134, which may be implemented as a virtual appliance. The gateway device 134 is configured to provide the VMs 108A and other devices in the private cloud computing environment 102 with connectivity to external devices via the public network 106.

The public cloud computing environment 104 of the hybrid cloud system 100 is configured to dynamically provide enterprises (referred to herein as "tenants") with one or more virtual computing environments 136 in which administrators of the tenants may provision virtual computing instances, e.g., the VMs 108B, and install and execute various applications. The public cloud computing environment 104 includes an infrastructure platform 138 upon which the virtual computing environments 136 can be executed. In the particular embodiment of FIG. 1, the infrastructure platform 138 includes hardware resources 140 having computing resources (e.g., hosts 142), storage resources (e.g., one or more storage array systems, such as a storage area network (SAN) 144), and networking resources (not illustrated), and a virtualization platform 146, which is programmed and/or configured to provide the virtual computing environments 136 that support the VMs 108B across the hosts 142. The virtualization platform 146 may be implemented using one or more software programs that reside and execute in one or more computer systems, such as the hosts 142, or in one or more virtual computing instances, such as the VMs 108B, running on the hosts 142.

In one embodiment, the virtualization platform 146 includes an orchestration component 148 that provides infrastructure resources to the virtual computing environments 136 responsive to provisioning requests. The orchestration component may instantiate VMs according to a requested template that defines one or more VMs having specified virtual computing resources (e.g., compute, networking and storage resources). Further, the orchestration component may monitor the infrastructure resource consumption levels and requirements of the virtual computing environments and provide additional infrastructure resources to the virtual computing environments as needed or desired. In one example, similar to the private cloud computing environment 102, the virtualization platform may be implemented by running on the hosts 142 VMware ESXi™-based hypervisor technologies provided by VMware, Inc. However, the virtualization platform may be implemented using any other virtualization technologies, including Xen®, Microsoft Hyper-V® and/or Docker virtualization technologies, depending on the processing entities being used in the public cloud computing environment 104.

In one embodiment, the public cloud computing environment 104 may include a cloud director 150 that manages allocation of virtual computing resources to different tenants. The cloud director 150 may be accessible to users via a REST (Representational State Transfer) API (Application Programming Interface) or any other client-server communication protocol. The cloud director 150 may authenticate connection attempts from the tenants using credentials issued by the cloud computing provider. The cloud director receives provisioning requests submitted (e.g., via REST API calls) and may propagate such requests to the orchestration component 148 to instantiate the requested VMs (e.g., the VMs 108B). One example of the cloud director 150 is the VMware vCloud Director® product from VMware, Inc.

In one embodiment, the cloud director 150 may include a network manager 152, which operates to manage and control virtual networks in the public cloud computing environment 104 and/or the private cloud computing environment 102. Virtual networks, also referred to as logical overlay networks, comprise logical network devices and connections that are then mapped to physical networking resources, such as physical network components, e.g., physical switches, physical hubs and physical routers, in a manner analogous to the manner in which other physical resources, such as compute and storage, are virtualized. In an embodiment, the network manager 152 has access to information regarding the physical network components in the public cloud computing environment 104 and/or the private cloud computing environment 102. With the physical network information, the network manager 152 may map the logical network configurations, e.g., logical switches, routers, and security devices to the physical network components that convey, route, and filter physical traffic in in the public cloud computing environment 104 and/or the private cloud computing environment 102. In one implementation, the network manager 152 is a VMware NSX® manager running on a physical computer, such as one of the hosts 142, or a virtual computing instance running on one of the hosts.

In one embodiment, at least some of the virtual computing environments 136 may be configured as a virtual data centers. Each virtual computing environment includes one or more virtual computing instances, such as the VMs 108B, and one or more virtualization managers 154. The virtualization managers 154 may be similar to the virtualization manager 128 in the private cloud computing environment 102. One example of the virtualization manager 154 is the VMware vCenter Server® product made available from VMware, Inc. Each virtual computing environment may further include one or more virtual networks 156 used to communicate between the VMs 108B running in that environment and managed by at least one networking gateway device 158 as well as one or more isolated internal networks 160 not connected to the gateway device 158. The gateway device 158, which may be a virtual appliance, is configured to provide the VMs 108B and other components in the virtual computing environment 136 with connectivity to external devices, such as components in the private cloud computing environment 102 via the network 106. The gateway device 158 operates in a similar manner as the gateway device 134 in the private cloud computing environment.

In one embodiment, each virtual computing environment 136 includes a hybrid cloud director 162 configured to communicate with the corresponding hybrid cloud manager 132 in the private cloud computing environment 102 to enable a common virtualized computing platform between the private and public cloud computing environments. The hybrid cloud director 162 may communicate with the hybrid cloud manager 132 using Internet-based traffic via a VPN tunnel, such as Internet Protocol security (IPsec) tunnel, established between the gateways 134 and 158, or alternatively, using a direct connection 164. The hybrid cloud director 162 and the corresponding hybrid cloud manager 132 facilitate cross-cloud migration of processing entities, such as VMs 108A and 108B, between the private and public computing environments. This cross-cloud migration may include both "cold migration" in which the VM is powered off during migration, as well as "hot migration" in which the VM is powered on during migration. Thus, the hybrid cloud director 162 and the corresponding hybrid cloud manager 132 can provide cross-cloud virtual data centers.

Figure 2:
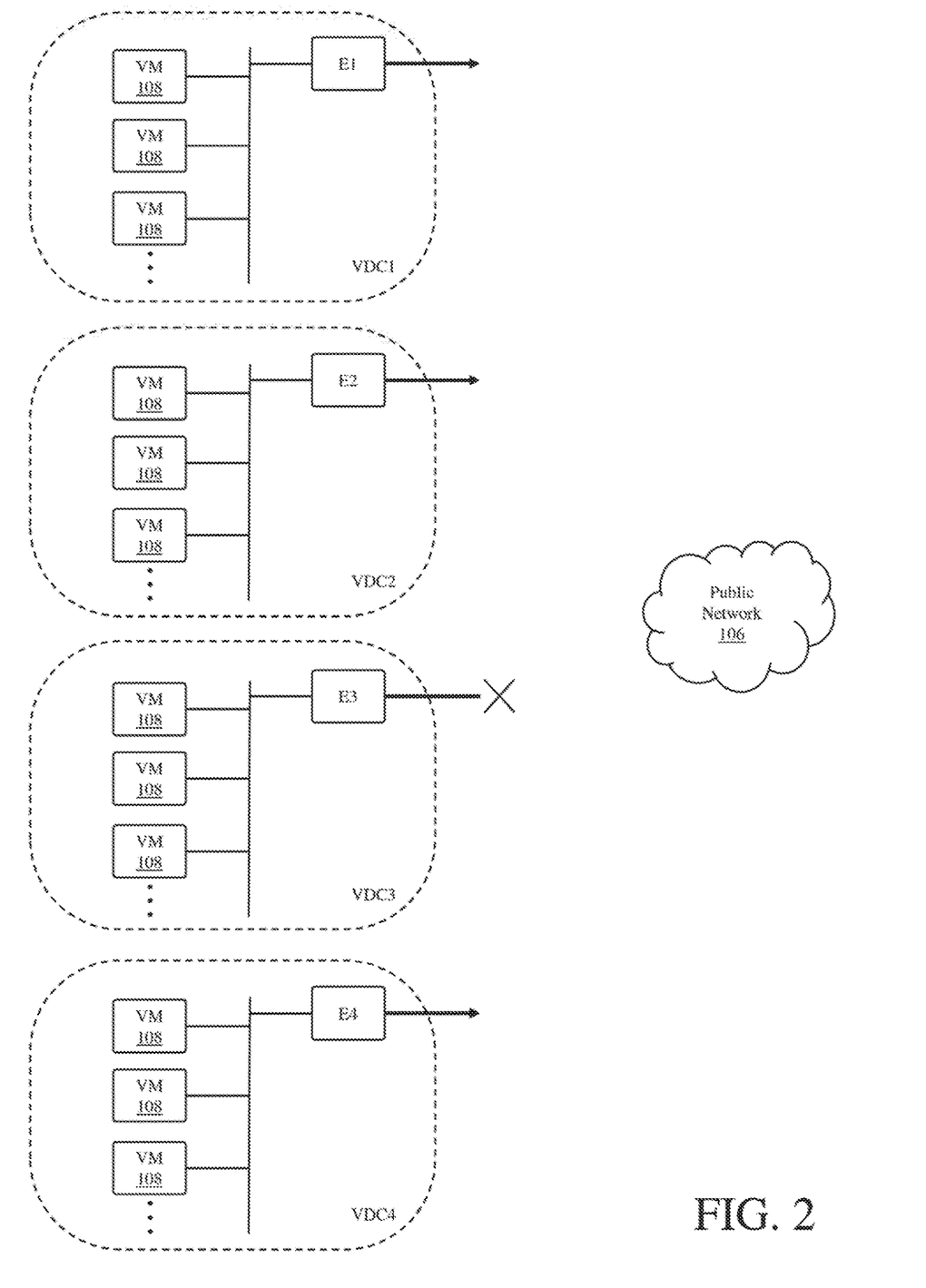
FIG. 2 is a block diagram of virtual data centers for a tenant of a public cloud computing environment.

FIG. 2 illustrates virtual data centers VDC1, VDC2, VDC3 and VDC4 that can be created in the hybrid computing environment provided by the hybrid cloud system 100 in accordance with an embodiment of the invention. In this example, these virtual data centers belong to a single tenant of the public cloud computing environment 104. As shown in FIG. 2, each virtual data center includes a number of VMs 108, which may reside in either the private cloud computing environment of the tenant or the public cloud computing environment 104. However, in other embodiments, each virtual data center may include any type of virtual computing instances, such as containers. In addition to the VMs, each virtual data center includes a virtual edge router E1, E2, E3 or E4. The virtual edge router in each virtual data center is configured or programmed to function as a virtual gateway. Thus, the virtual edge routers may provide networking services, such as firewall service, network address translation (NAT) service and dynamic host configuration protocol (DHCP) service. The virtual edge routers may be implemented in any computer systems, such as the hosts 142 in the public cloud computing environment 104, or any virtual computing instances, such as the VMs 108B running in the public cloud computing environment 104.

For communications within each of the virtual data centers VDC1, VDC2, VDC3 and VDC4, public IP addresses are not needed to send and receive IP packets or communications between the VMs 108 in the same virtual data center. Rather, communications within each of the virtual data centers can be carried out using private IP addresses. However, for communications involving the public network 106, public IP addresses are needed to send and receive IP packets between the VMs in the virtual data centers VDC1, VDC2, VDC3 and VDC4 and the public network 106. Thus, at least one public IP address is needed for each virtual data center that needs to communicate with the public network 106.

In FIG. 2, the virtual data centers VDC1, VDC2 and VDC4 need to communicate with the public network 106, while the virtual data center VDC3 does not need to do so. Thus, the virtual data centers VDC1, VDC2 and VDC4 are on open networks, i.e., have connectivity to the public network 106, and the virtual date data VDC3 is on an isolated network, i.e., does not have connectivity to the public network. If these virtual data centers are configured in a conventional manner, each of the virtual data centers would use private IP addresses so that the VMs 108 in each virtual data center can communicate with each other using the private IP addresses. In addition, each of the virtual data centers VDC1, VDC2 and VDC4 would need to be provided with a different public IP address to communicate with the public network 106. However, the virtual data center VDC3 would not need a public IP address since the virtual data center VDC3 does not need to communicate with the public network 102. Such network topology is illustrated in FIG. 3A.

Figure 3A:
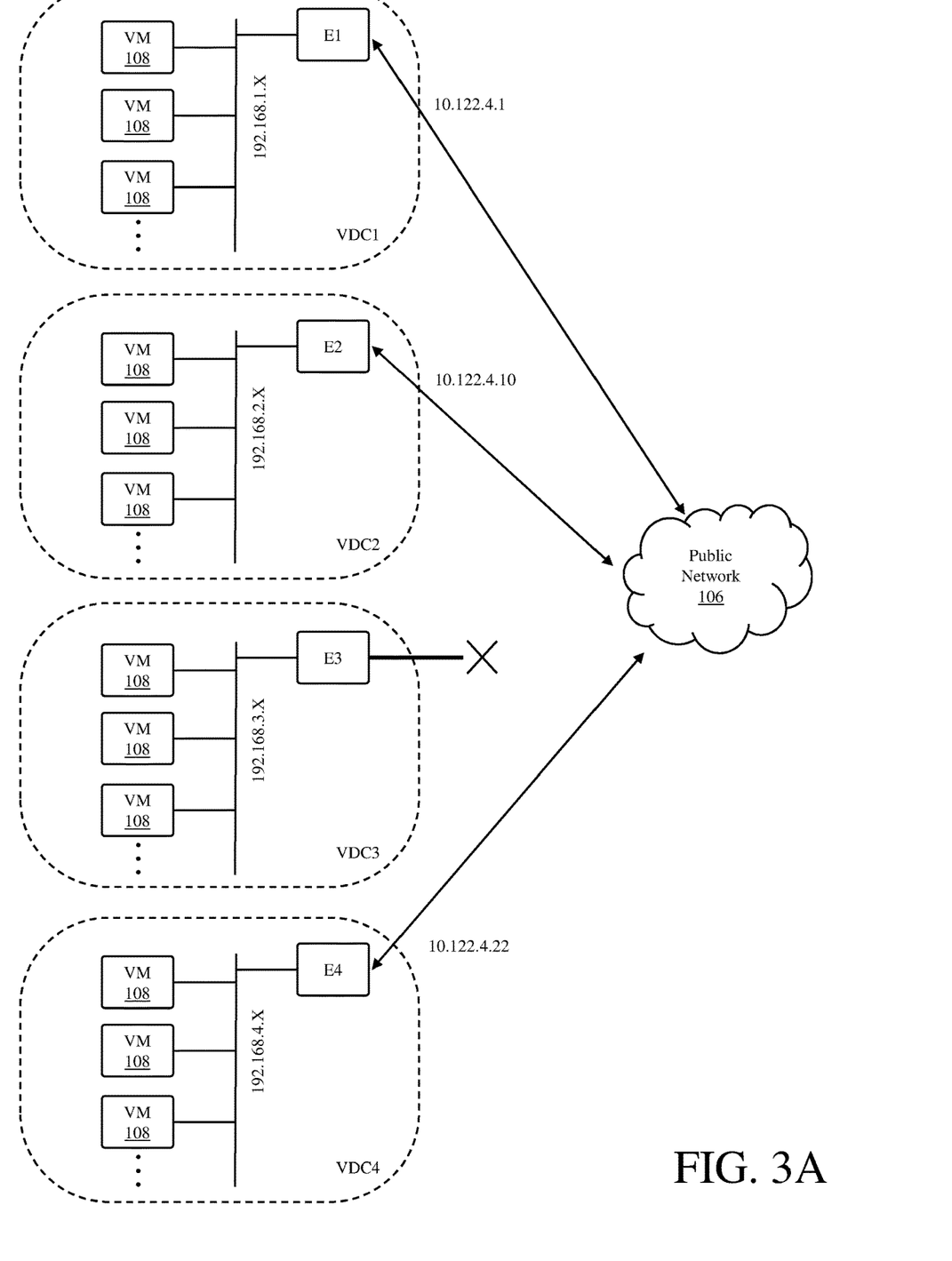
FIG. 3A is a diagram of a network topology for virtual data centers, where each virtual data center is assigned a public IP address.

As shown in FIG. 3A, each of the virtual data centers VDC1, VDC2, VDC3 and VDC4 uses private IP addresses so that the VMs 108 within each virtual data center can communicate with each other. In particular, the virtual data centers VDC1, VDC2, VDC3 and VDC4 use the private IP addresses of 192.168.1.x, 192.168.2.x, 192.168.3.x and 192.168.4.x, respectively. In addition, the virtual data centers VDC1, VDC2 and VDC4 use the public IP addresses of 10.122.4.1, 10.122.4.10 and 10.122.4.22, respectively. However, the virtual data center VDC3 does not have a public P address, and thus, the VMs 108 in the virtual data center VDC3 cannot communicate with the public network 106. Therefore, the virtual data centers VDC1, VDC2 and VDC4 have connectivity to the public network 106, while the virtual data center VDC3 does not. If additional virtual data centers with connectivity to the public network are created for this tenant, each of these additional virtual data centers would need a unique pubic IP address. Thus, the configuration of virtual data centers illustrated in FIG. 3A does not efficiently conserve the limited resource of public IP addresses.

Figure 3B:
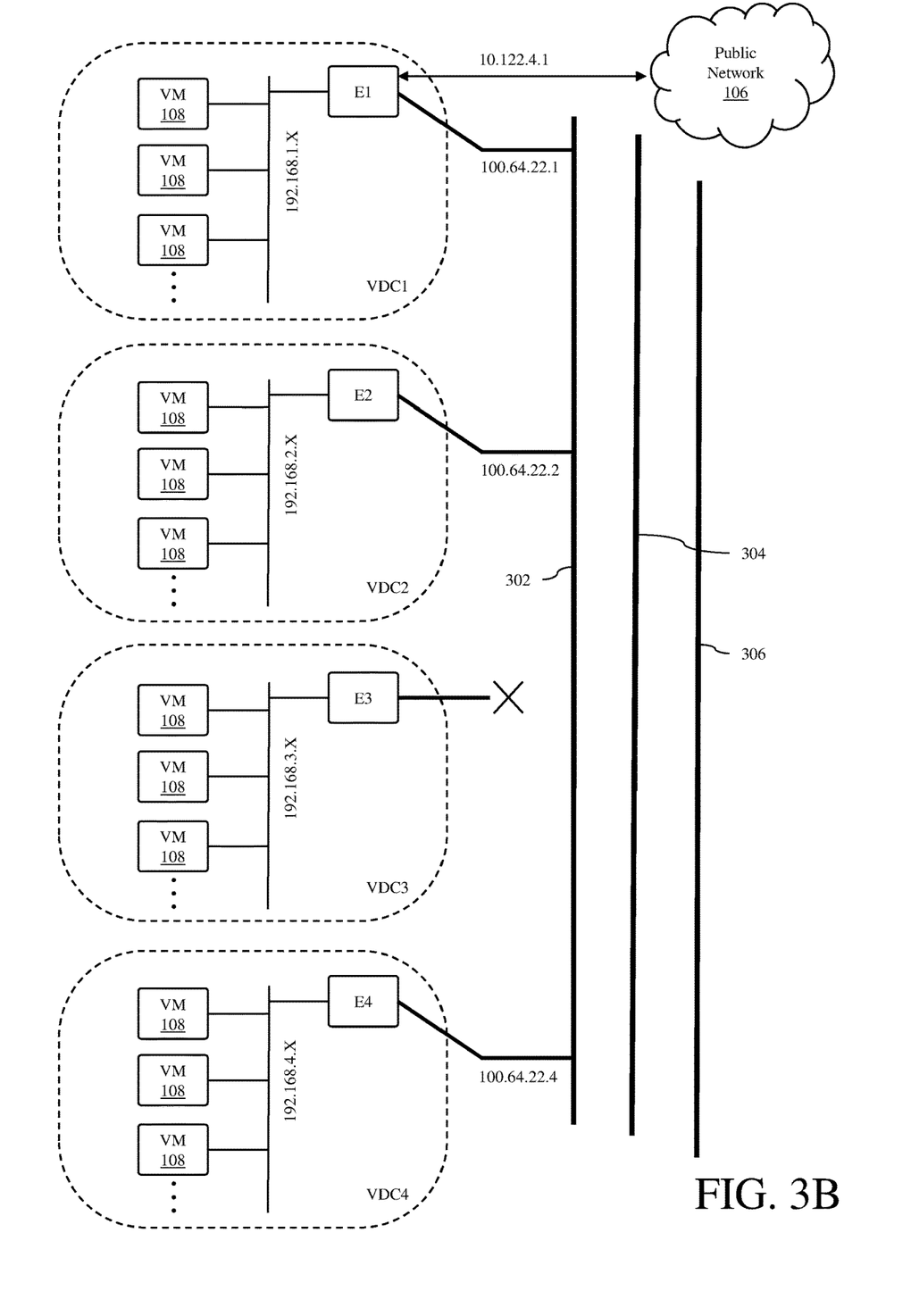
FIG. 3B is a diagram of a network topology for virtual data centers, where only one virtual data center is assigned a public IP address in accordance with an embodiment of the invention.

In order to conserve and better manage the limited resource of public IP addresses, the hybrid cloud system 100 employs a different network topology for the virtual data centers VDC1, VDC2, VDC3 and VDC4, which is illustrated in FIG. 3B. In this network topology, similar to the previous network topology, the virtual data centers VDC1, VDC2 and VDC4 have connectivity to the public network 106, while the virtual data center VDC3 does not have connectivity to the public network. However, among the three virtual data centers VDC1, VDC2 and VDC4 that have connectivity to the public network 106, only the virtual data center VDC1 has direct connectivity to the public network. The other two virtual data centers VDC2 and VDC4 have indirect connectivity to the public network 106 via the virtual data center VDC1. Thus, only the virtual edge router E1 of the virtual data center VDC1 has direct connectivity to the public network 106. As such, the virtual edge router E1 will sometimes be referred to herein as the exit virtual edge router of the exit virtual data center for the virtual data centers VDC1, VDC2 and VDC4. That is, communications between the virtual edge router E1 of the virtual data center VDC1 and the public network 106 do not have to be routed through a virtual edge router of another virtual data center. For communications between the virtual edge routers E2 and E4 of the virtual data centers VDC2 and VDC4 and the public network 106, these communications are routed to the edge router E1 of the virtual data center VDC1 through a virtual overlay network 302, which may be a VXLAN backed overlay network. Thus, the configuration of virtual data centers illustrated in FIG. 3B requires only a single public IP address for three virtual data centers to have connectivity to the public network 106. Using this configuration, additional virtual data centers can be created for this tenant or customer without consuming additional public IP addresses. In FIG. 3B, two more virtual overlay networks 304 and 306 are illustrated. Each of these overlay networks may be utilized by other tenants for similar purpose. It is noted here that each tenant can only "see" its own virtual overlay network and cannot otherwise view or access other virtual overlay networks. Each VXLAN provides an L2 isolation from the other, thus ensuring the tenants are segregated through an overlaid L2 network isolation.

The configuration of virtual data centers illustrated in FIG. 3B requires modification of NAT rules for the virtual edge routers E1, E2 and E4 of the virtual data centers VDC1, VDC2 and VDC4. The virtual edge router E3 of the virtual data center VDC3 does not have to be modified since this virtual data center is on an isolated network. In the configuration of virtual data centers illustrated in FIG. 3A, the virtual edge router E1, E2 or E4 of each of the virtual data centers VDC1, VDC2 and VDC4 has direct connectivity to the public network 106. Thus, each of these virtual edge routers needs to route communications from the VMs 108 of its respective virtual data center to the public network 106, which means that the virtual edge router needs to only translate the source addresses of these communications from private IP addresses used in its virtual data center to the public IP address assigned to that virtual edge router. The source NAT (SNAT) rules for the virtual edge routers E1, E2 and E4 in this conventional configuration are illustrated in Table 1 below.

TABLE 1

| Edge; Applied On | SNAT Source IP | SNAT Target IP |
|---|---|---|
| E1; public_uplink | <VM_Internal_IP> (192.168.1.X) | <Public_IP_E1_uplink> (10.122.4.1) |
| E2; public_uplink | <VM_Internal_IP> (192.168.2.X) | <Public_IP_E2_uplink> (10.122.4.10) |
| E4; public_uplink | <VM_Internal_IP> (192.168.4.X) | <Public_IP_E4_uplink> (10.122.4.22) |

The SNAT rules in Table 1 show that the source addresses of communications to the public network 106 from the virtual data centers VDC1, VDC2 and VDC4 via their respective virtual edge routers E1, E2 and E4 ("public uplinks") will be translated from the private IP addresses ("SNAT Source IP") used in each of the virtual data centers to the public IP address ("SNAT Target IP") assigned to the virtual edge router of that virtual data center. Thus, the source addresses of communications from the virtual data center VDC1 using the private IP addresses of 192.168.1.X will be translated to the public IP address of 10.122.4.1. Similarly, the source addresses of communications from the virtual data centers VDC2 and VDC4 using the private IP addresses of 192.168.2.X and 192.168.4.X, respectively, will be translated to the public IP addresses of 10.122.4.10 and 10.122.4.22, respectively. Replies to the communications may be routed back to the originating VMs using connection tracking data, which is collected as the communication are transmitted to their destinations. If destination NAT (DNAT) rules are used for communications from the public network to the virtual data centers, the DNAT rules will be the reverse of the SNAT rules set forth in Table 1.

In contrast, for the configuration of virtual data centers illustrated in FIG. 3B, only the virtual edge router E1 of the virtual data center VDC1 has direct connectivity to the public network 106. Thus, each of the other two virtual edge routers E2 and E4 of the virtual data centers VDC2 and VDC4 needs to first route communications destined for the public network 106 to the virtual edge router E1 of the virtual data center VDC1, rather than routing the communications directly to the public network. Thus, the virtual edge routers E2 and E4 need to translate the source addresses of communications to the public network 106 from private IP addresses used in their respective virtual data centers to virtual overlay network IP addresses (e.g., VXLAN identification number) assigned to their respective virtual data centers. The virtual edge router E1 of the virtual data center VDC1 then routes these communications from the virtual data centers VDC2 and VDC4 to the public network 106. Thus, the virtual edge router E1 needs to translate the source addresses of communications to the public network 106 from the virtual overlay network IP addresses assigned to the virtual data center VDC2 and VDC4 to the public IP address assigned to the virtual data center VDC1. In addition, the virtual edge router E1 routes communications from its own virtual data center VDC1 to the public network 106, which will also involve a source translation from the private IP addresses used in the virtual data center VDC1 to the public IP address assigned to the virtual data center VDC1. For communications from the public network 106, the virtual edge router E1 routes these communications to their destination virtual data centers. The SNAT rules for the virtual edge routers E1, E2 and E4 in the configuration in accordance with the embodiment shown in FIG. 3B are illustrated in Table 2 below.

TABLE 2

| Edge; Applied On | SNAT Source IP | SNAT Target IP |
| --- | --- | --- |
| E1; public_uplink | <VM_Internal_IP> (192.168.1.X) | <Public_IP_E1_uplink> (10.122.4.1) |
| E1; public_uplink | <Overlay_IP_E2_uplink> (100.64.22.2) | <Public_IP_E1_uplink> (10.122.4.1) |
| E1; public_uplink | <Overlay_IP_E4_uplink> (100.64.22.4) | <Public_IP_E1_uplink> (10.122.4.1) |
| E2; overlay_uplink | <VM_Internal_IP> (192.168.2.X) | <Overlay_IP_E2_uplink> (100.64.22.2) |
| E4; overlay_uplink | <VM_Internal_IP> (192.168.4.X) | <Overlay_IP_E4_uplink> (100.64.22.4) |

The SNAT rules in Table 2 show that communications to the public network 106 from the virtual data centers VDC2 and VDC4 will be translated so that all communications to the public network will be routed through the virtual edge router E1 of the virtual data center VDC1. Thus, the source addresses of communications from the virtual data center VDC2 using the private IP addresses of 192.168.2.X will be translated to the virtual overlay network IP address of 100.64.22.2. Similarly, the source addresses of communications from the virtual data center VDC4 using the private IP addresses of 192.168.4.X will be translated to the virtual overlay network IP address of 100.64.22.4. At the virtual edge router E1, the source addresses of these communications from the virtual data centers VDC2 and VDC4 are translated from the virtual overlay network IP addresses of 100.64.22.2 and 100.64.22.4, respectively, to the public IP address of 10.122.4.1. Replies to the communications may be routed back to the originating VMs using connection tracking data, which is collected as the communication are transmitted to their destinations. If destination NAT (DNAT) rules are used for communications from the public network to the virtual data centers, the DNAT rules will be the reverse of the SNAT rules set forth in Table 2.

Figure 4:
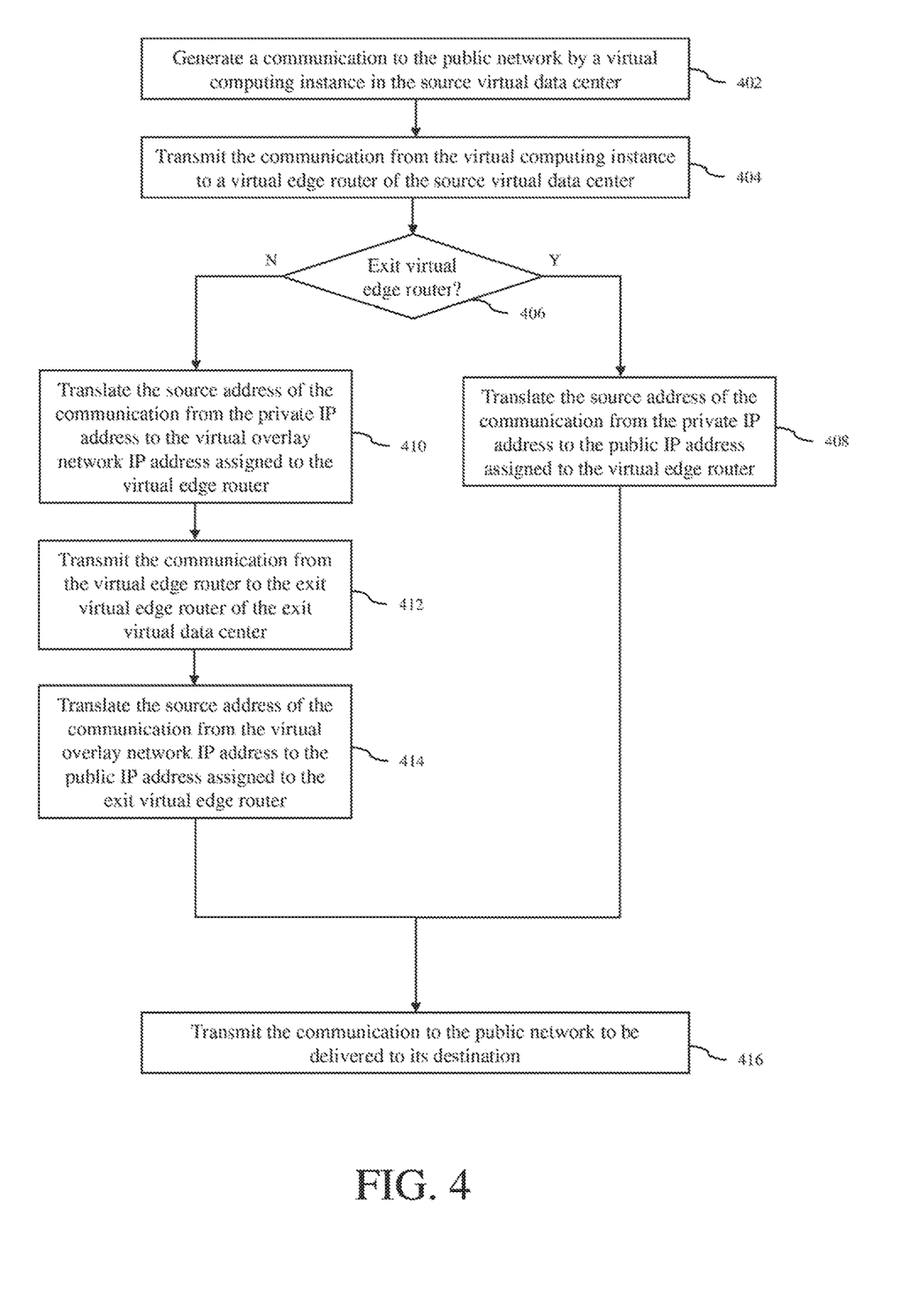
FIG. 4 is a process flow diagram of a method of routing communications from a group of virtual data centers in the hybrid cloud system to the public network in order to manage public IP addresses in accordance with an embodiment of the invention.

The method of routing communications from a group of virtual data centers in the hybrid cloud system 100 to the public network 106 in order to manage public IP addresses in accordance with an embodiment of the invention is described with reference to a process flow diagram of FIG. 4. At block 402, a communication to the public network 106 is generated by a virtual computing instance, e.g., a VM, running in one of the virtual data centers in the group, which will be referred to herein as the source virtual data center. The generated communication includes a source address, which in this case is the private IP address used in the source virtual data center and assigned to the virtual computing instance. At block 404, the communication is transmitted from the virtual computing instance to a virtual edge router of the source virtual data center.

At block 406, if the virtual edge router of the source virtual data center is the exit virtual edge router for the group of the virtual data centers that has a direct connectivity to the public network 106, the method proceeds to block 408, where the source address of the communication is translated by the virtual edge router of the source virtual data center from the private IP address assigned to the virtual computing instance to the public IP address assigned to the virtual edge router. Next, at block 416, the communication is transmitted to the public network to be delivered to its destination.

However, if the virtual edge router of the source virtual data center is not the exit virtual edge router for the group of the virtual data centers, the method proceeds to block 410, where the source address of the communication is translated from the private IP address assigned to the virtual computing instance to the virtual overlay network IP address assigned to the virtual edge router. Next at block 412, the communication is transmitted from the virtual edge router of the source virtual data center to the exit virtual edge router of the exit virtual data center that has direct connectivity to the public network 106.

At block 414, the source address of the communication is translated by the exit virtual edge router from the virtual overlay network IP address to the public IP address assigned to the exit virtual edge router. The process then proceeds to block 416, where the communication is transmitted to the public network 106 to be delivered to its destination.

Figure 5:
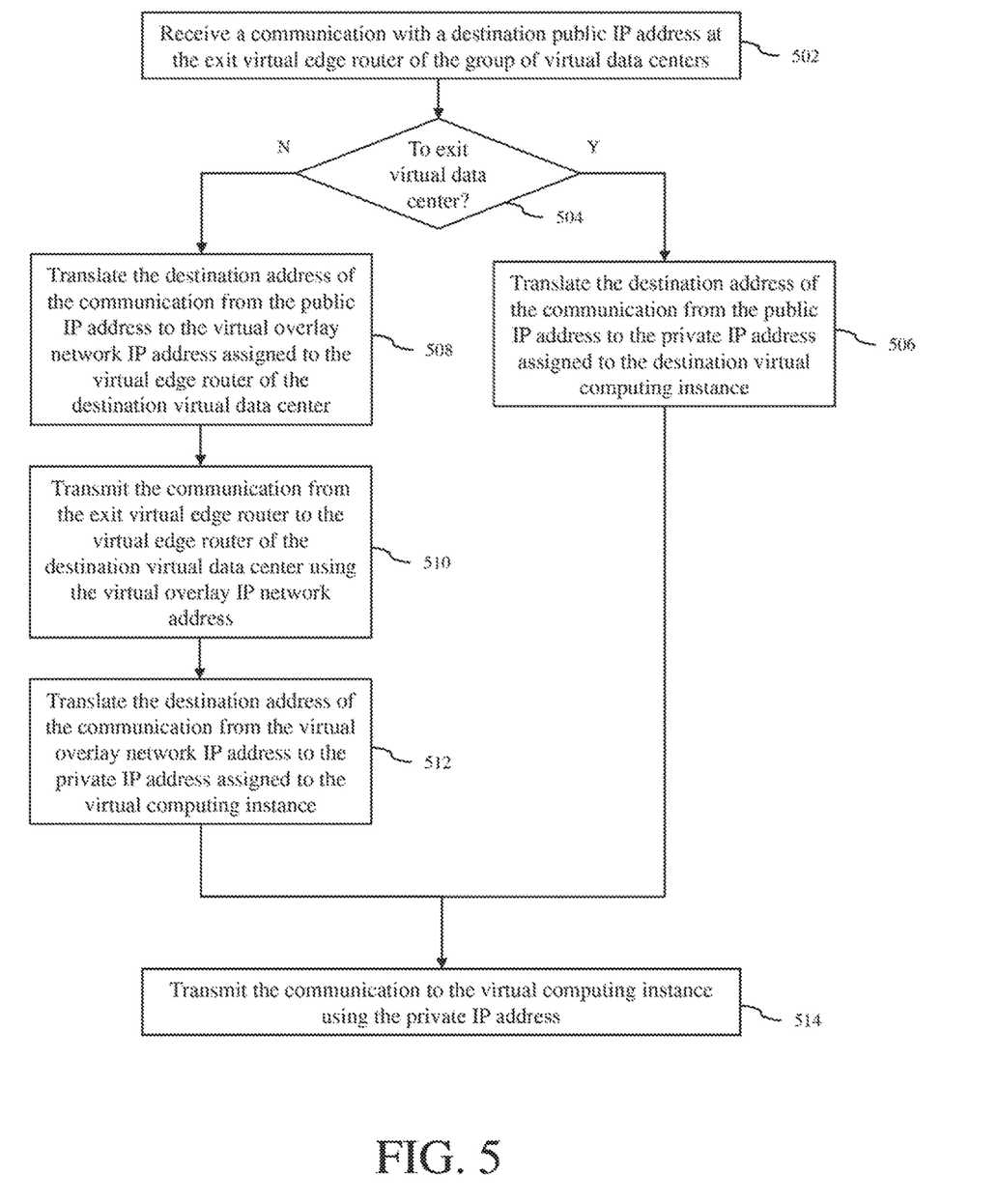
FIG. 5 is a process flow diagram of a method of routing communications from the public network to a group of virtual data centers in the hybrid cloud system in order to manage public IP addresses in accordance with an embodiment of the invention.

The method of routing communications from the public network 106 to a group of virtual data centers in the hybrid computing system 100 in order to manage public IP addresses in accordance with an embodiment of the invention is described with reference to a process flow diagram of FIG. 5. At block 502, a communication with a destination address is received at the exit virtual edge router of the group of virtual data centers. Initially, the destination address of the communication is the public IP address assigned to the exit virtual edge router.

At block 504, if the communication is destined for a virtual computing instance running in the exit virtual data center to which the exit virtual edge router belongs, the method proceeds to block 506, where the destination address of the communication is translated by the exit virtual edge router from the public IP address assigned to the exit virtual edge router to the private IP address used in the exit virtual data center and assigned to the virtual computing instance. The destination virtual data center for the communication can be determined using various known packet routing techniques, such as using port values. Next, at block 514, the communication is transmitted to the virtual computing instance using the private IP address assigned to the virtual computing instance.

However, if the communication is destined for a virtual computing instance running in another virtual data center, the method proceeds to block 508, where the destination address of the communication is translated from the public IP address assigned to the exit virtual edge router to the virtual overlay network IP address assigned to the virtual edge router of the virtual data center to which the virtual computing instance belongs, i.e., the virtual edge router of the destination virtual data center. Next, at block 510, the communication is transmitted from the exit virtual edge router to the virtual edge router of the virtual data center to which the virtual computing instance belongs using the virtual overlay network IP address.

At block 512, the destination address of the communication is translated by the virtual edge router of the virtual data center to which the virtual computing instance belongs from the virtual overlay network IP address assigned to that virtual edge router to the private IP address used in the virtual data center and assigned to the virtual computing instance. The method then proceeds to block 514, where the communication is transmitted to the virtual computing instance using the private IP address assigned to the virtual computing instance.

Although embodiments of the invention have been described in the context of a hybrid cloud computing environments, the embodiments of the invention may be applied to any computing environments, such as private or public cloud computing environments.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for managing public internet protocol (IP) addresses for a group of virtual data centers that are connected through a virtual extensible local area network (VXLAN) backed overlay network in a computer system, the method comprising:

from a plurality of virtual computing instances running in a plurality of virtual data centers in the group of virtual data centers, transmitting a plurality of communications destined for a public network to a plurality of virtual edge routers in the plurality of virtual data centers, the communications including a plurality of source private IP addresses that are assigned to the virtual computing instances, each virtual data center of the plurality of virtual data centers being connected to the VXLAN backed overlay network, wherein the plurality of virtual data centers include a first virtual data center and a second virtual data center, wherein each source private IP address that is assigned to each virtual computing instance running in the first virtual data center includes a same first network identification, wherein each source private IP address that is assigned to each virtual computing instance running in the second virtual data center includes a same second network identification, and wherein the second network identification is different from the first network identification;

at the virtual edge routers in the plurality of virtual data centers, translating the source private IP addresses of the communications to a plurality of VXLAN identification numbers assigned to the plurality of virtual data centers, wherein each of the VXLAN identification numbers includes a same third network identification, and wherein the third network identification is different from the first network identification and the second network identification;

transmitting the communications from the virtual edge routers in the plurality of virtual data centers to an exit virtual edge router of an exit virtual data center in the group of virtual data centers through the VXLAN backed overlay network, wherein the exit virtual edge router of the exit virtual data center is the only virtual edge router connected to the VXLAN backed overlay network that has direct connectivity to the public network;

at the exit virtual edge router in the exit virtual data center, translating the VXLAN identification numbers assigned to the plurality of virtual data centers to a public IP address assigned to the exit virtual data center;

transmitting the communications from the exit virtual edge router of the exit virtual data center to the public network using the public IP address as a source address of the communications;

from a set of virtual computing instances running in the exit virtual data center, transmitting a second communication destined for the public network to the exit virtual edge router, the second communication including a second plurality of source private IP addresses that are assigned to the set of virtual computing instances, wherein each source private IP address that is assigned to each virtual computing instance of the set of virtual computing instances running in the exit virtual data center includes a same fourth network identification, and wherein the fourth network identification is different from the first network identification, the second network identification, and the third network identification;

at the exit virtual edge router in the exit virtual data center, translating the second plurality of source private IP addresses of the second communication to the public IP address assigned to the exit virtual data center; and transmitting the second communication from the exit virtual edge router of the exit virtual data center to the public network using the public IP address as a source address of the second communication.

2. The method of claim 1, wherein transmitting the communications from the virtual edge routers in the plurality of virtual data centers to the exit virtual edge router of the exit virtual data center in the group of virtual data centers through the VXLAN backed overlay network includes transmitting-one of the communications from a first VXLAN tunnel endpoint (VTEP) for a first virtual edge router of the virtual edge routers in the plurality of virtual data centers to a second VTEP for the exit virtual edge router.

3. The method of claim 1, wherein the virtual edge routers in the plurality of virtual data centers are not assigned any public IP address.

4. The method of claim 1, wherein the plurality of virtual data centers belong to an entity and are isolated from other virtual data centers in the computer system that belong to other entities.

5. The method of claim 1, wherein the virtual computing instances are virtual machines.

6. A non-transitory computer-readable storage medium containing program instructions for managing public internet protocol (IP) addresses for a group of virtual data centers that are connected through a virtual extensible local area network (VXLAN) backed overlay network in a computer system, wherein execution of the program instructions by one or more processors of a computer system causes the one or more processors to perform steps comprising:

from a plurality of virtual computing instances running in a plurality of virtual data centers in the group of virtual data centers, transmitting a plurality of communications destined for a public network to a plurality of virtual edge routers in the plurality of virtual data centers, the communications including a plurality of source private IP addresses that are assigned to the virtual computing instances, each virtual data center of the plurality of virtual data centers being connected to the VXLAN backed overlay network, wherein the plurality of virtual data centers include a first virtual data center and a second virtual data center, wherein each source private IP address that is assigned to each virtual computing instance running in the first virtual data center includes a same first network identification, wherein each source private IP address that is assigned to each virtual computing instance running in the second virtual data center includes a same second network identification, and wherein the second network identification is different from the first network identification;

at the virtual edge routers in the plurality of virtual data centers, translating the source private IP addresses of the communications to a plurality of VXLAN identification numbers assigned to the plurality of virtual data centers, wherein each of the VXLAN identification numbers includes a same third network identification, and wherein the third network identification is different from the first network identification and the second network identification;

transmitting the communications from the virtual edge routers in the plurality of virtual data centers to an exit virtual edge router of an exit virtual data center in the group of virtual data centers through the VXLAN backed overlay network, wherein the exit virtual edge router of the exit virtual data center is the only virtual edge router connected to the VXLAN backed overlay network that has direct connectivity to the public network;

at the exit virtual edge router in the exit virtual data center, translating the VXLAN identification numbers assigned to the plurality of virtual data centers to a public IP address assigned to the exit virtual data center;

transmitting the communications from the exit virtual edge router of the exit virtual data center to the public network using the public IP address as a source address of the communications;

from a set of virtual computing instances running in the exit virtual data center, transmitting a second communication destined for the public network to the exit virtual edge router, the second communication including a second plurality of source private IP addresses that are assigned to the set of virtual computing instances, wherein each source private IP address that is assigned to each virtual computing instance of the set of virtual computing instances running in the exit virtual data center includes a same fourth network identification, and wherein the fourth network identification is different from the first network identification, the second network identification, and the third network identification;

at the exit virtual edge router in the exit virtual data center, translating the second plurality of source private IP addresses of the second communication to the public IP address assigned to the exit virtual data center; and transmitting the second communication from the exit virtual edge router of the exit virtual data center to the public network using the public IP address as a source address of the second communication.

7. The computer-readable storage medium of claim 6, wherein-one of the communications from a first VXLAN tunnel endpoint (VTEP) for a first virtual edge router of the virtual edge routers in the plurality of virtual data centers to a second VTEP for the exit virtual edge router.

8. The computer-readable storage medium of claim 6, wherein-the virtual edge routers in the plurality of virtual data centers are not assigned any public IP address.

9. The computer-readable storage medium of claim 6, wherein-the plurality of virtual data centers belong to an entity and are isolated from other virtual data centers in the computer system that belong to other entities.

10. The computer-readable storage medium of claim 6, wherein the virtual computing instances are virtual machines.

11. A system comprising:
a plurality of host computers interconnected via physical network components;
a group of virtual data centers that are connected through a virtual extensible local area network (VXLAN) backed overlay network, each virtual data center of the group of virtual data centers configured on the plurality of host computers, wherein the group of virtual data centers comprises a plurality of virtual data centers and an exit virtual data center, each virtual data center of the plurality of virtual data centers being connected to the VXLAN backed overlay network,
wherein each of the plurality of virtual data centers includes at least one virtual computing instance and a virtual edge router, virtual edge routers of the plurality of virtual data centers being configured to translate a plurality of source private IP addresses of communications for a public network from a plurality of virtual computing instances running in the plurality of virtual data centers to a plurality of VXLAN identification numbers assigned to the plurality of virtual data centers and transmit the communications to an exit virtual edge router of the exit virtual data center through the VXLAN backed overlay network, wherein the plurality of virtual data centers include a first virtual data center and a second virtual data center, wherein each source private IP address that is assigned to each virtual computing instance running in the first virtual data center includes a same first network identification, wherein each source private IP address that is assigned to each virtual computing instance running in the second virtual data center includes a same second network identification, wherein the second network identification is different from the first network identification, wherein each of the VXLAN identification numbers includes a same third network identification, wherein the third network identification is different from the first network identification and the second network identification, wherein only the exit virtual edge router is assigned a public IP address to communicate with the public network, wherein the exit virtual edge router is the only virtual edge router connected to the VXLAN backed overlay network that has direct connectivity to the public network, wherein the exit virtual edge router is configured to translate the VXLAN identification numbers assigned to the plurality of virtual data centers to the public IP address assigned to the exit virtual data center and transmit the communications to the public network using the public IP address as a source address of the communications, wherein the exit virtual edge router is further configured to translate a second plurality of source private IP addresses of a second communication from a set of virtual computing instances running in the exit virtual data center to the public IP address assigned to the exit virtual data center and transmit the second communication from the exit virtual edge router of the exit virtual data center to the public network using the public IP address as a source address of the second communication, wherein each source private IP address that is assigned to each virtual computing instance of the set of virtual computing instances running in the exit virtual data center includes a same fourth network identification, and wherein the fourth network identification is different from the first network identification, the second network identification, and the third network identification.

12. The system of claim 11, further comprising a first VXLAN tunnel endpoint (VTEP) for a first virtual edge router of the virtual edge routers in the plurality of virtual data centers and a second VTEP for the exit virtual edge router, the first VTEP and the second VTEP being part of the VXLAN backed overlay network.

13. The system of claim 11, wherein the plurality of virtual data centers belong to an entity and are isolated from other virtual data centers in the computer system that belong to other entities.

14. The system of claim 11, wherein the virtual computing instances are virtual machines.

* * * * *